United States Patent
Stine et al.

(10) Patent No.: US 10,293,251 B2
(45) Date of Patent: May 21, 2019

(54) PRE-LOADING TRANSLATED CODE IN CLOUD BASED EMULATED APPLICATIONS

(71) Applicant: Sony Interactive Entertainment Inc., Tokyo (JP)

(72) Inventors: Jacob P. Stine, La Honda, CA (US); Victor Octav Suba Miura, Foster City, CA (US); Brian Michael Christopher Watson, San Francisco, CA (US); Nicholas J. Cardell, Foster City, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 26 days.

(21) Appl. No.: 15/640,483

(22) Filed: Jul. 1, 2017

(65) Prior Publication Data

US 2017/0296915 A1 Oct. 19, 2017

Related U.S. Application Data (63) Continuation of application No. 13/631,785, filed on Sep. 28, 2012, now Pat. No. 9,694,276.

(51) Int. Cl.
*A63F 9/24* (2006.01)
*A63F 13/35* (2014.01)
(Continued)

(52) U.S. Cl.
CPC .............. *A63F 13/35* (2014.09); *A63F 13/12* (2013.01); *A63F 13/30* (2014.09); *A63F 13/358* (2014.09);
(Continued)

(58) Field of Classification Search
CPC ............ A63B 24/0062; A63B 24/0072; A63B 2220/14; G06F 3/0484; G06F 2212/1004; A63F 2300/552
See application file for complete search history.

(56) References Cited

U.S. PATENT DOCUMENTS 6,009,458 A 12/1999 Hawkins et al.
6,115,054 A 9/2000 Giles
(Continued)

FOREIGN PATENT DOCUMENTS

CN 1192013 A 9/1998
CN 101346162 B 3/2012
(Continued)

OTHER PUBLICATIONS

Non-Final Office Action for U.S. Appl. No. 15/225,361, dated Oct. 21, 2016.
(Continued)

*Primary Examiner* — James S. McClellan
*Assistant Examiner* — Kevin M Carter
(74) *Attorney, Agent, or Firm* — JDI Patent; Joshua D. Isenberg; Robert Pullman (57) ABSTRACT

Pre-translated code for an emulated application may be retrieved and executed to translate data from the emulated application into a form compatible with the client device before receiving a request for the emulated application from the client device. The translated data may be delivered to the client device platform over a network after receiving the request for the emulated application from the client device.

25 Claims, 4 Drawing Sheets

(51) Int. Cl.
   *A63F 13/30* (2014.01)
   *A63F 13/358* (2014.01)
   *A63F 13/60* (2014.01)
   A63F 13/40 (2014.01)
   A63F 13/323 (2014.01)

(52) U.S. Cl.
   CPC .............. *A63F 13/60* (2014.09); *A63F 13/10* (2013.01); *A63F 13/323* (2014.09); *A63F 2300/207* (2013.01); *A63F 2300/209* (2013.01); *A63F 2300/552* (2013.01)

(56) References Cited

U.S. PATENT DOCUMENTS

| | | |
|---|---|---|
| 6,267,673 B1 | 7/2001 | Miyamoto et al. |
| 6,280,323 B1 | 8/2001 | Yamazaki et al. |
| 6,402,620 B1 | 6/2002 | Naghi |
| 6,699,127 B1 | 3/2004 | Lobb et al. |
| 7,159,008 B1 | 1/2007 | Wies et al. |
| 7,286,132 B2 | 10/2007 | Kuhne |
| 7,470,196 B1 | 12/2008 | Joshi |
| 7,493,365 B2 | 2/2009 | Wies et al. |
| 7,577,826 B2 | 8/2009 | Suba |
| 7,782,327 B2 | 8/2010 | Gonzalez et al. |
| 7,841,946 B2 | 11/2010 | Walker et al. |
| 8,267,796 B2 | 9/2012 | Iwakiri |
| 8,321,571 B2 | 11/2012 | Crowder, Jr. et al. |
| 8,661,496 B2 | 2/2014 | Perlman et al. |
| 8,935,487 B2 | 1/2015 | Sengupta et al. |
| 9,248,374 B2 | 2/2016 | Watson et al. |
| 9,258,012 B2 | 2/2016 | Miura |
| 9,694,276 B2 | 7/2017 | Stine et al. |
| 9,849,372 B2 | 12/2017 | Stine et al. |
| 9,925,468 B2 | 3/2018 | Stine et al. |
| 2001/0031665 A1 | 10/2001 | Taho et al. |
| 2002/0002510 A1 | 1/2002 | Sharp et al. |
| 2002/0004584 A1 | 1/2002 | Laughlin |
| 2002/0045484 A1 | 4/2002 | Eck et al. |
| 2002/0065915 A1 | 5/2002 | Anderson et al. |
| 2003/0037030 A1* | 2/2003 | Dutta ....................... G06F 8/71 |
| 2003/0061279 A1* | 3/2003 | Llewellyn ............... G06F 9/542 |
| | | 709/203 |
| 2003/0190950 A1 | 10/2003 | Matsumoto |
| 2003/0225560 A1 | 12/2003 | Garcia et al. |
| 2004/0179019 A1 | 9/2004 | Sabella et al. |
| 2004/0224772 A1 | 11/2004 | Canessa et al. |
| 2004/0266529 A1 | 12/2004 | Chatani |
| 2005/0195187 A1 | 9/2005 | Seiler et al. |
| 2005/0261062 A1* | 11/2005 | Lewin ....................... A63F 13/12 |
| | | 463/42 |
| 2005/0288954 A1* | 12/2005 | McCarthy ............. A61B 5/6815 |
| | | 705/2 |
| 2006/0009290 A1 | 1/2006 | Taho et al. |
| 2006/0046819 A1* | 3/2006 | Nguyen ................... G07F 17/32 |
| | | 463/16 |
| 2006/0080702 A1 | 4/2006 | Diez et al. |
| 2006/0117260 A1 | 6/2006 | Sloo et al. |
| 2006/0146057 A1 | 7/2006 | Blythe |
| 2006/0148571 A1 | 7/2006 | Hossack et al. |
| 2006/0160626 A1* | 7/2006 | Gatto ....................... A63F 13/12 |
| | | 463/43 |
| 2006/0259292 A1 | 11/2006 | Solomon et al. |
| 2007/0060361 A1 | 3/2007 | Nguyen et al. |
| 2007/0298866 A1 | 12/2007 | Gaudiano et al. |
| 2008/0032794 A1 | 2/2008 | Ware et al. |
| 2008/0113749 A1 | 5/2008 | Williams et al. |
| 2008/0263527 A1* | 10/2008 | Miura .................. G06F 9/45504 |
| | | 717/138 |
| 2008/0282241 A1 | 11/2008 | Dong |
| 2008/0300053 A1 | 12/2008 | Muller |
| 2009/0082102 A1 | 3/2009 | Sargaison et al. |
| 2009/0088236 A1 | 4/2009 | Laude et al. |
| 2009/0094600 A1* | 4/2009 | Sargaison ................... G06F 8/61 |
| | | 717/177 |
| 2009/0098943 A1 | 4/2009 | Weber et al. |
| 2009/0131177 A1 | 5/2009 | Pearce |
| 2009/0162029 A1 | 6/2009 | Glen |
| 2009/0282139 A1 | 11/2009 | Mejdrich et al. |
| 2009/0303245 A1 | 12/2009 | Soupikov et al. |
| 2010/0088296 A1 | 4/2010 | Periyagaram et al. |
| 2010/0167809 A1 | 7/2010 | Perlman et al. |
| 2010/0214301 A1 | 8/2010 | Li et al. |
| 2010/0250650 A1* | 9/2010 | Allen ........................ G06F 8/76 |
| | | 709/203 |
| 2010/0259536 A1 | 10/2010 | Toksvig et al. |
| 2011/0013699 A1 | 1/2011 | Persson |
| 2011/0098111 A1 | 4/2011 | Saito et al. |
| 2011/0218037 A1 | 9/2011 | Singh |
| 2011/0276661 A1* | 11/2011 | Gujarathi .............. G06F 9/4445 |
| | | 709/219 |
| 2011/0299105 A1 | 12/2011 | Morrison et al. |
| 2012/0021840 A1 | 1/2012 | Johnson et al. |
| 2012/0052930 A1 | 3/2012 | Mcgucken |
| 2012/0142425 A1* | 6/2012 | Scott .................... G07F 17/3227 |
| | | 463/42 |
| 2012/0299940 A1 | 11/2012 | Dietrich et al. |
| 2013/0137518 A1* | 5/2013 | Lucas ..................... A63F 13/12 |
| | | 463/42 |
| 2013/0165233 A1 | 6/2013 | Wada |
| 2014/0004941 A1 | 1/2014 | Christopher Watson et al. |
| 2014/0004949 A1 | 1/2014 | Miura et al. |
| 2014/0004956 A1 | 1/2014 | Miura et al. |
| 2014/0004957 A1 | 1/2014 | Stine et al. |
| 2014/0004962 A1 | 1/2014 | Miura et al. |
| 2014/0066177 A1 | 3/2014 | Zalewski |
| 2014/0092087 A1 | 4/2014 | Kazama et al. |
| 2014/0094299 A1 | 4/2014 | Stine et al. |
| 2014/0094313 A1 | 4/2014 | Watson et al. |
| 2014/0094314 A1 | 4/2014 | Watson et al. |
| 2014/0094315 A1 | 4/2014 | Stine et al. |
| 2017/0312639 A1 | 11/2017 | Watson et al. |
| 2017/0312640 A1 | 11/2017 | Watson et al. |

FOREIGN PATENT DOCUMENTS

| | | |
|---|---|---|
| CN | 101889442 B | 10/2014 |
| EP | 1172132 A | 1/2002 |
| EP | 1225767 A2 | 7/2002 |
| EP | 2039404 A2 | 3/2009 |
| EP | 2040163 A1 | 3/2009 |
| JP | 2009072601 A | 4/2009 |
| JP | 2012034793 A | 2/2012 |
| RU | 2364938 C2 | 8/2009 |
| WO | 2004024259 A | 3/2004 |
| WO | 2014052205 A1 | 4/2014 |

OTHER PUBLICATIONS

Non-Final Office Action for U.S. Appl. No. 13/631,785, dated Oct. 22, 2014.
Non-Final Office Action for U.S. Appl. No. 13/631,803, dated Oct. 14, 2014.
Non-Final Office Action for U.S. Appl. No. 13/791,379, dated Oct. 16, 2014.
Non-Final Office Action U.S. Appl. No. 151225,361, dated Oct. 21, 2016.
Non-Final/Final Office Action for U.S. Appl. No. 13/792,664, dated Jul. 31, 2017.
Notice of Allowance for U.S. Appl. No. 13/631,812, dated Aug. 9, 2017.
Notice of Allowance for U.S. Appl. No. 13/791,379, dated Nov. 9, 2017.
Notice of Allowance for U.S. Appl. No. 13/631,725, dated Oct. 6, 2015.
Notice of Allowance for U.S. Appl. No. 13/631,740, dated Mar. 16, 2017.
Notice of Allowance for U.S. Appl. No. 13/631,785, dated Feb. 27, 2017.
Notice of Allowance for U.S. Appl. No. 13/631,803, dated Sep. 17, 2015.

(56) References Cited

OTHER PUBLICATIONS

Notice of Allowance for U.S. Appl. No. 13/790,311, dated Mar. 30, 2017.
Notice of Allowance for U.S. Appl. No. 13/790,320, dated Dec. 5, 2016.
Notice of Allowance for U.S. Appl. No. 14/183,351, dated Oct. 5, 2015.
Notice of Allowance for U.S. Appl. No. 15/019,891, dated Jan. 26, 2017.
PCT International Search Report and Written Opinion for International Application No. PCT/US2013/061023, dated Jan. 23, 2014.
PCT International Search Report and Written Opinion for International Application No. PCT/US2013/061029, dated Jan. 23, 2014.
U.S. Appl. No. 13/631,725, entitled "Replay and Resumption of Suspended Game" to Brian Michael Christopher Watson et al., filed Sep. 28, 2012.
U.S. Appl. No. 13/631,740, entitled "Method for Creating a Mini-Game" to Brian Michael Christopher Watson et al., filed Sep. 28, 2012.
U.S. Appl. No. 13/631,803, entitled "Adaptive Load Balancing in Software Emulation of GPU Hardware", to Takayuki Kazama and Victor Octav Suba Miura, filed Sep. 28, 2012.
U.S. Appl. No. 13/631,812, entitled "Method and Apparatus for Improving Efficiency Wihout Increasing Latency in Emulation of a Legacy Application Title" to Jacob P. Stine et al., filed Sep. 28, 2012.
U.S. Appl. No. 13/790,320, entitled "Determining Triggers for Cloud-Based Emulated Games" Victor Octav Suba Miura et al., filed Mar. 8, 2013.
U.S. Appl. No. 61/666,628, entitled "Adding Triggers to Cloud-Based Emulated Games" to Victor Octav Suba Miura et al., filed Jun. 30, 2013.
U.S. Appl. No. 61/666,645, entitled "Haptic Enhancements for Emulated Video Game Not Originally Designed With Haptic Capabilities" to Victor Octav Suba Miura, et al., filed Jun. 29, 2012.
U.S. Appl. No. 61/666,665, entitled "Conversion of Haptic Events Into Screen Events" to Brian Michael, et al., filed Jun. 30, 2013.
U.S. Appl. No. 61/666,679, entitled "Suspending State of Cloud-Based Legacy Application" to Jacob P. Stine et al., filed Jun. 30, 2013.
U.S. Appl. No. 61/694,718, to Gary M. Zalewski, to Gary M. Zalewski, filed Aug. 29, 2012.
U.S. Appl. No. 61/794,811, to Victor Octav Suba Miura, filed Mar. 15, 2013.
Chinese Office Action for CN Application No. 201380045408.4, dated Sep. 20, 2016.
European Search Report and Written Opinion for EP Application No. 13841130.1, dated Oct. 4, 2016.
European Search Report and Written Opinion for European Application No. PCT/US2013/047856, dated Jul. 28, 2016.
Final Office Action for U.S. Appl. No. 13/631,725, dated Dec. 19, 2014.
Final Office Action for U.S. Appl. No. 13/631,740, dated Jul. 27, 2015.
Final Office Action for U.S. Appl. No. 13/631,785, dated Dec. 4, 2015.
Final Office Action for U.S. Appl. No. 13/631,803, dated Feb. 1, 2016.
Final Office Action for U.S. Appl. No. 13/631,812, dated Aug. 29, 2014.
Final Office Action for U.S. Appl. No. 13/790,311, dated Jul. 15, 2016.
Final Office Action for U.S. Appl. No. 13/790,320, dated Feb. 10, 2016.
Final Office Action for U.S. Appl. No. 13/790,320, dated Jan. 15, 2015.
Final Office Action for U.S. Appl. No. 13/791,379, dated May 13, 2015.
Final Office Action for U.S. Appl. No. 13/791,420, dated Jun. 11, 2014.
Final Office Action for U.S. Appl. No. 13/791,420, dated Oct. 9, 2015.
Final Office Action for U.S. Appl. No. 13/791,434, dated Feb. 17, 2016.
Final Office Action for U.S. Appl. No. 13/791,434, dated Jun. 23, 2015.
Final Office Action for U.S. Appl. No. 15/019,891, dated Oct. 19, 2016.
Final Office Action for U.S. Appl. No. 13/631,803, dated Apr. 16, 2015.
Final Office Action for U.S. Appl. No. 13/790,311, dated Mar. 27, 2015.
Japanese Office Action for Japan Code Application No. 2015-517495, dated Feb. 9, 2016.
International Search Report and Written Opinion for International Application No. PCT/US2013/074813, dated May 29, 2014.
Grand Theft Auto: San Andreas Guide—Territories, May 29, 2012 https://www.youtube.com/watch?v=5d2GY-grsFA.
GTA San Andreas How to start a gang war, https://www.youtube.com/watch?v=9N4908kGtLO, Jan. 13, 2013.
Nonfinal Office Action dated Apr. 21, 2017 for U.S. Appl. No. 13/791,379.
Non-Final Office Action for U.S. Appl. No. 13/790,311, dated Jun. 27, 2013.
Non-Final Office Action for U.S. Appl. No. 13/631,725, dated Mar. 16, 2015.
Non-Final Office Action for U.S. Appl. No. 13/631,725, dated Sep. 12, 2014.
Non-Final Office Action for U.S. Appl. No. 13/631,740, dated Oct. 21, 2014.
Non-Final Office Action for U.S. Appl. No. 13/631,812, dated Jun. 3, 2016.
Non-Final Office Action for U.S. Appl. No. 13/631,812, dated Mar. 28, 2014.
Non-Final Office Action for U.S. Appl. No. 13/790,311, dated Feb. 26, 2014.
Non-Final Office Action for U.S. Appl. No. 13/790,311, dated Sep. 9, 2014.
Non-Final Office Action for U.S. Appl. No. 13/790,320, dated Jun. 18, 2014.
Non-Final Office Action for U.S. Appl. No. 13/791,379, dated Mar. 27, 2014.
Non-Final Office Action for U.S. Appl. No. 13/791,420, dated Mar. 27, 2014.
Non-Final Office Action for U.S. Appl. No. 13/792,664, dated Jun. 23, 2014.
Non-Final Office Action for U.S. Appl. No. 13/792,664, dated Jul. 31, 2017.
Non-Final Office Action for U.S. Appl. No. 13/791,434, dated Nov. 26, 2014.
Non-Final Office Action for U.S. Appl. No. 13/631,740, dated Feb. 27, 2015.
Non-Final Office Action for U.S. Appl. No. 13/631,740, dated Sep. 30, 2016.
Non-Final Office Action for U.S. Appl. No. 13/631,785, dated May 21, 2015.
Non-Final Office Action for U.S. Appl. No. 13/631,785, dated Nov. 3, 2016.
Non-Final Office Action for U.S. Appl. No. 13/631,803, dated Sep. 17, 2015.
Non-Final Office Action for U.S. Appl. No. 13/631,812, dated Jan. 18, 2017.
Non-Final Office Action for U.S. Appl. No. 13/790,311, dated Nov. 19, 2015.
Non-Final Office Action for U.S. Appl. No. 13/790,320, dated Jul. 28, 2015.
Non-Final Office Action for U.S. Appl. No. 13/791,379, dated Jul. 1, 2016.
Non-Final Office Action for U.S. Appl. No. 13/791,420, dated Apr. 9, 2015.
Non-Final Office Action for U.S. Appl. No. 14/183,351, dated May 11, 2015.

(56) References Cited

OTHER PUBLICATIONS

Non-Final Office Action for U.S. Appl. No. 15/019,891, dated May 6, 2016.
Communication under EPC Rule 94(3) dated Apr. 23, 2018 in European Patent Application No. 13881307.6.
First Examination Report dated Feb. 23, 2018 for Indian Patent Application 3524/CHE/2013.
Non-Final Office Action for U.S. Appl. No. 15/650,729, dated Aug. 2, 2018.
Non-Final Office Action for U.S. Appl. No. 15/650,755, dated Aug. 2, 2018.
Non-Final Office Action for U.S. Appl. No. 15/838,065, dated Nov. 7, 2018.
Non-Final/Final Office Action for U.S. Appl. No. 13/792,664, dated Apr. 6, 2018.
Non-Final Office Action for U.S. Appl. No. 13/792,664, dated Dec. 6, 2018.
Final Office Action for U.S. Appl. No. 15/650,729, dated Jan. 7, 2019.
Final Office Action for U.S. Appl. No. 15/650,755, dated Jan. 7, 2019.
Notice of Allowance for U.S. Appl. No. 15/838,065, dated Feb. 25, 2019.

* cited by examiner

PRE-LOADING TRANSLATED CODE IN CLOUD BASED EMULATED APPLICATIONS

CLAIM OF PRIORITY

This application is a continuation of U.S. patent application Ser. No. 13/631,785 to Jacob P. Stine et al., filed Sep. 28, 2012 and entitled "PRE-LOADING TRANSLATED CODE IN CLOUD BASED EMULATED APPLICATIONS", the entire contents of which are incorporated herein by reference.

CROSS-REFERENCE TO RELATED APPLICATION

This application is related to commonly-assigned, provisional application Ser. No. 61/666,628, filed Jun. 29, 2012, and entitled "DETERMINING TRIGGERS FOR CLOUD-BASED EMULATED GAMES", the entire disclosures of which are incorporated herein by reference.

This application is related to commonly-assigned, provisional application Ser. No. 61/666,645, filed Jun. 29, 2012, and entitled "HAPTIC ENHANCEMENTS FOR EMULATED VIDEO GAME NOT ORIGINALLY DESIGNED WITH HAPTIC CAPABILITIES", the entire disclosures of which are incorporated herein by reference.

This application is related to commonly-assigned, provisional application Ser. No. 61/666,665, filed Jun. 29, 2012, and entitled "CONVERSION OF HAPTIC EVENTS INTO SCREEN EVENTS", the entire disclosures of which are incorporated herein by reference.

This application is related to commonly-assigned, provisional application Ser. No. 61/666,679, filed Jun. 29, 2012, and entitled "SUSPENDING STATE OF CLOUD-BASED LEGACY APPLICATIONS", the entire disclosures of which are incorporated herein by reference.

This application is related to commonly-assigned, application Ser. No. 13/631,725, filed Sep. 28, 2012, and entitled "REPLAY AND RESUMPTION OF SUSPENDED GAME", to Brian Michael Christopher Watson, Victor Octav Suba Miura, Jacob P. Stine, and Nicholas J. Cardell, the entire disclosures of which are incorporated herein by reference.

This application is related to commonly-assigned, application Ser. No. 13/631,740, filed Sep. 28, 2012, and entitled "METHOD FOR CREATING A MINI-GAME" to Brian Michael Christopher Watson, Victor Octav Suba Miura, and Jacob P. Stine, the entire disclosures of which are incorporated herein by reference.

This application is related to commonly-assigned, application Ser. No. 13/631,803, filed Sep. 28, 2012, and entitled "ADAPTIVE LOAD BALANCING IN SOFTWARE EMULATION OF GPU HARDWARE", to Takayuki Kazama and Victor Octav Suba Miura, the entire disclosures of which are incorporated herein by reference.

This application is related to commonly-assigned, application Ser. No. 13/631,812, filed Sep. 28, 2012, entitled "METHOD AND APPARATUS FOR IMPROVING EFFICIENCY WITHOUT INCREASING LATENCY IN EMULATION OF A LEGACY APPLICATION TITLE", to Jacob P. Stine and Victor Octav Suba Miura, the entire disclosures of which are incorporated herein by reference.

FIELD OF THE DISCLOSURE

The present disclosure is related to video game emulation. Among other things, this disclosure describes a method and apparatus for pre-loading emulated applications.

BACKGROUND OF THE INVENTION

Video games are commonly loaded into a random access memory (RAM) before a player may begin playing the game. This loading process may take a substantial amount of time. Instead of showing a blank screen to the game player, games are often designed with a loading screen. Loading screens may be a picture or a video related to the game, or even a progress bar. However, these loading screens are often not desirable. Preferably, once a game is selected, the game should be immediately playable. The effects of loading time are compounded further when games are being emulated and being delivered over a cloud based network. The delivery over the network may create an additional wait time. Also, network delays may cause the delivery of the emulated data to a game player's device to be slowed as well.

Further still, games are designed to be loaded from a predetermined starting position. Incremental buffering may be used in order to make the game load faster from this predetermined starting position. Incremental buffering is a technique that may be used to allow a game to load faster. Instead of having to build a large buffer from the beginning of the game, the buffer is initially small and then grows in size as the gameplay progresses. However, when a game is loaded at a location where the incremental buffering was not incorporated into the design of the game, the loading time may take even longer because a larger buffer must first be built at this position of the game. With the growth in popularity of mini-games, the ability to load a game quickly from any point in the game is highly desirable. In order to implement faster loading through incremental buffering, a game designer would be required to re-code parts of the game. This additional step would increase the time and cost required for developing mini-games.

Therefore, there is a need in the art for a method and apparatus for pre-loading translated code in a cloud based emulation. It is within this context that aspects of the present disclosure arise.

DETAILED DESCRIPTION OF THE DRAWINGS

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

According to aspects of the present disclosure, an emulator may be one of a plurality of virtual machines on a cloud based server. The emulator may be created by the server in response to demand for a given emulated application. Once the emulator has been generated by the server, the emulator may access an application that is to be emulated. The emulator may then begin translating the code of the application. The translated code may be stored in a cache. When a client device platform selects the application that has been emulated by the emulator, the emulator may deliver the translated application data to the client device platform over the network. According to aspects of the present disclosure, the emulated application may be a legacy game, a snapshot of a legacy game, an audio file, a video file, a mobile application, a desktop application or a web application.

According to additional aspects of the present disclosure, the emulator may be provided with a snapshot of a legacy game. The snapshot of the legacy game may have addresses of the stored data abstracted from the snapshot. This enables the snapshot to be platform independent. However, the emulator needs the addresses of the data in order to properly emulate the legacy game. Therefore, the addresses may be generated from platform independent information in the snapshot through an automated process. Once the addresses have been generated, the emulator may begin translating the code and storing emulated game data in a memory. Once the legacy game has been selected by a client device platform, the emulator may deliver the emulated data to the client device platform over a network.

According to additional aspects of the present disclosure, the prediction engine may direct the emulator as to which legacy game it should begin loading before a client device platform makes a selection for a game. By way of example, and not by way of limitation the prediction engine may use historical data, player profile information, trigger information from a game currently being played, or behavior patterns in order to determine which game should be pre-loaded by the emulator.

Figure 1:
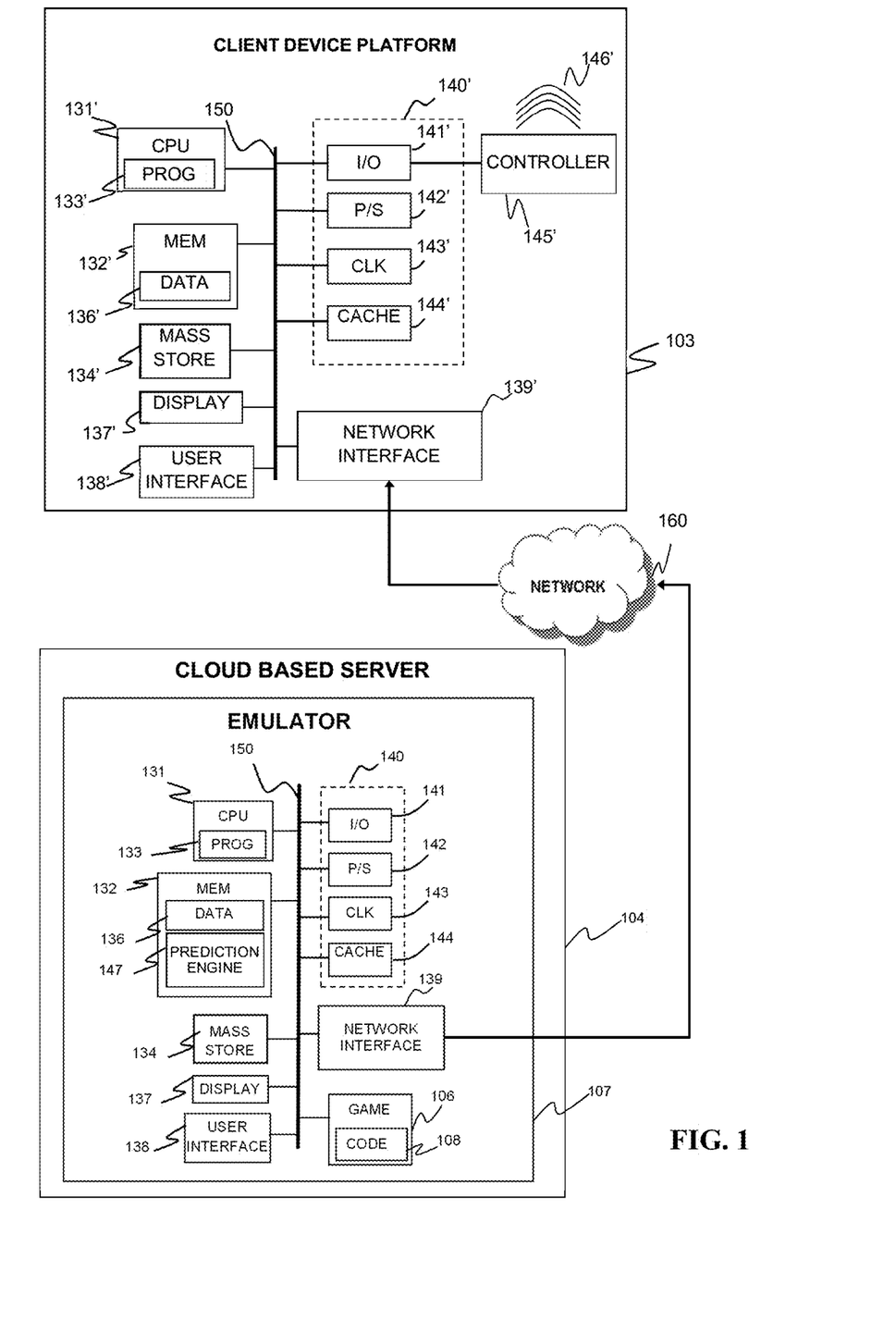
FIG. 1 is a schematic diagram of a client device platform and an emulator residing on a cloud based server communicating over a network according to an aspect of the present disclosure.

FIG. 1 is a schematic diagram illustrating a system containing components that can implement emulation in accordance with aspects of the present disclosure. An emulator 107 may be one of a plurality of emulators 107 on a cloud based server 104. An emulator 107 may be accessed by a client device platform 103 over a network 160. The client device platform 103 may access alternative emulators 107 over the network 160. The emulators 107 may be identical to each other, or they may each be programmed to emulate unique legacy game titles 106 or unique sets of legacy game titles 106. The emulator 107 may be a virtual machine that can be built or deleted by a cloud based server 104. This enables the cloud based server 104 to meet the demand during times of peak usage without having to waste resources when usage is low.

The client device platform 103 may include a central processor unit (CPU) 131'. By way of example, a CPU 131' may include one or more processors, which may be configured according to any suitable processor architecture, e.g., a dual-core, quad-core, multi-core, or Cell processor architecture. The client device platform 103 may also include a memory 132' (e.g., RAM, DRAM, ROM, and the like). The CPU 131' may execute a process-control program 133', portions of which may be stored in the memory 132'. The client device platform 103 may also include well-known support circuits 140', such as input/output (I/O) circuits 141', power supplies (P/S) 142', a clock (CLK) 143' and cache 144'. The client device platform 103 may optionally include a mass storage device 134' such as a disk drive, CD-ROM drive, tape drive, or the like to store programs and/or data. The client device platform 103 may also optionally include a display unit 137' and a user interface unit 138' to facilitate interaction between the client device platform 103 and a user. The display unit 137' may be in the form of a cathode ray tube (CRT) or flat panel screen that displays text, numerals, or graphical symbols. The user interface unit 138' may include a keyboard, mouse, joystick, light pen, or other device. A controller 145' may be connected to the client device platform 103 through the I/O circuit 141' or it may be directly integrated into the client device platform 103. The controller 145' may facilitate interaction between the client device platform 103 and a user. The controller 145' may include a keyboard, mouse, joystick, light pen, hand-held controls or other device. The controller 145' may also be capable of generating a haptic response 146'. By way of example and not by way of limitation, the haptic response 146' may be implemented in the form of mechanical vibrations or any other feedback corresponding to the sense of touch. The client device platform 103 may include a network interface 139', configured to enable the use of Wi-Fi, an Ethernet port, or other communication methods.

The network interface 139' may incorporate suitable hardware, software, firmware or some combination of two or more of these to facilitate communication via an electronic communications network 160. The network interface 139' may be configured to implement wired or wireless communication over local area networks and wide area networks such as the Internet. The client device platform 103 may send and receive data and/or requests for files via one or more data packets over the network 160.

The preceding components may exchange signals with each other via an internal system bus 150'. The client device platform 103 may be a general purpose computer that becomes a special purpose computer when running code that implements embodiments of the present invention as described herein.

The emulator 107 may include a central processor unit (CPU) 131. By way of example, a CPU 131 may include one or more processors, which may be configured according to any suitable processor architecture, e.g., a dual-core, quad-core, multi-core, or Cell processor architecture. The emulator 107 may also include a memory 132 (e.g., RAM, DRAM, ROM, and the like). The CPU 131 may execute a process-control program 133, portions of which may be stored in the memory 132. The emulator 107 may also include well-known support circuits 140, such as input/output (I/O) circuits 141, power supplies (P/S) 142, a clock (CLK) 143 and cache 144. The emulator 107 may optionally include a mass storage device 134 such as a disk drive, CD-ROM drive, tape drive, or the like to store programs and/or data. The emulator 107 may also optionally include a display unit 137 and user interface unit 138 to facilitate interaction between the emulator 107 and a user who requires direct access to the emulator 107. By way of example and not by way of limitation an engineer may need direct access to the emulator 107 in order to program the emulator 107 to properly emulate a desired legacy game 106 or to add additional mini-game capabilities to a legacy game 106. The display unit 137 may be in the form of a cathode ray tube (CRT) or flat panel screen that displays text, numerals, or graphical symbols. The user interface unit 138 may include a keyboard, touchpad, touch screen, mouse, joystick, light pen, or other device. The emulator 107 may include a network interface 139, configured to enable the use of Wi-Fi, an Ethernet port, or other communication methods.

The network interface 139 may incorporate suitable hardware, software, firmware or some combination of two or more of these to facilitate communication via the electronic communications network 160. The network interface 139 may be configured to implement wired or wireless communication over local area networks and wide area networks such as the Internet. The emulator 107 may send and receive data and/or requests for files via one or more data packets over the network 160.

The preceding components may exchange signals with each other via an internal system bus 150. The emulator 107 may be a general purpose computer that becomes a special purpose computer when running code that implements embodiments of the present invention as described herein.

The emulator 107 may access a legacy game 106 through the internal system bus 150. There may be more than one legacy game 106 stored in the emulator. The legacy games may also be stored in the memory 132 or in the mass storage device 134. Additionally, one or more legacy games 106 may be stored at a remote location accessible to the emulator 107 over the network 160. Each legacy game 106 contains game code 108. When the legacy game 106 is emulated, the game code 108 produces legacy game data 109. Legacy game data 109 may be received by the client device platform 103 and displayed on the display unit 137'.

By way of example, a legacy game 106 may be any game that is not compatible with a client device platform 103. By way of example and not by way of limitation, the legacy game 106 may have been designed to be played on Sony Computer Entertainment's PlayStation console, but the client device platform 103 is a home computer. By way of example, the legacy game 106 may have been designed to be played on a PlayStation 2 console, but the client device platform 103 is a PlayStation 3 console. Further, by way of example and not by way of limitation, a legacy game 106 may have been designed to be played on a PlayStation console, but the client device platform 103 is a hand held console such as the PlayStation Portable (PSP) or Vita from Sony Computer Entertainment.

In some implementations, but not all, the emulator 107 may be a deterministic emulator. A deterministic emulator is an emulator that may process a given set of game inputs the same way every time that the same set of inputs are provided to the emulator 107. Game inputs may be signals sent by the client device platform 103 to the emulator 107 in order to advance the emulated game from a first state to a second state. By way of example, the game inputs may be directions for the main character of a game to move on the screen, a selection of an item from a menu in the game or any other action that may take place during the playing of the game. An emulator 107 may be made deterministic by eliminating any dependencies in the code run by the emulator 107 that depend from asynchronous activity. Asynchronous activities are events that occur independently of the main program flow. This means that actions may be executed in a non-blocking scheme in order to allow the main program flow to continue processing. Therefore, by way of example, and not by way of limitation, the emulator 107 may be deterministic when the dependencies in the code 108 depend from basic blocks that always begin and end with synchronous activity. By way of example, basic blocks may be predetermined increments of code at which the emulator 107 checks for external events or additional game inputs 347. The emulator 107 may also wait for any activities that run asynchronously within a system component to complete before proceeding to the next basic block. When no asynchronous activities are running, the emulator 107 may be thought of as running all of the basic blocks of the code 108 in lock step. In such a case, the emulator 107 is sometimes said to be in a "steady state".

Figure 2A:
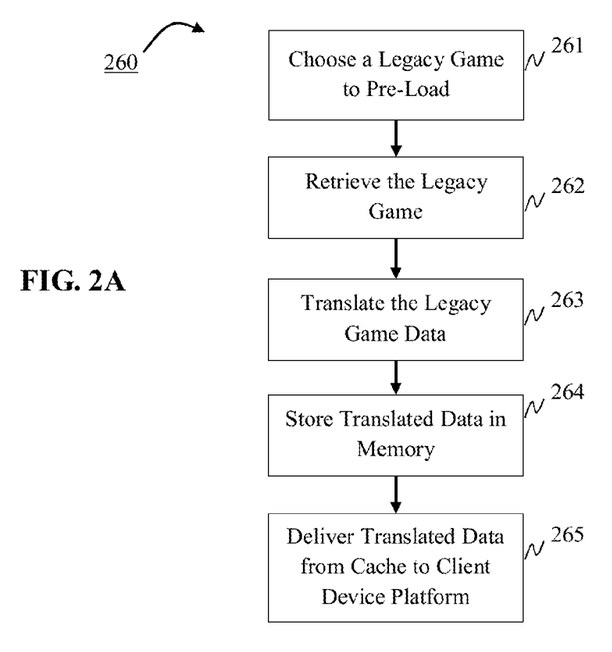
FIG. 2A is a block diagram of a method for pre-loading an emulated application according to an aspect of the present disclosure.

As shown in FIG. 2A, the emulator 107 may be configured to implement a method for pre-loading a legacy game 106 according to an inventive method 260. Various aspects of the method 260 may be implemented by execution of computer executable instructions running on the emulator 107 in conjunction with the actions client device platform 103. Specifically, an emulator 107 may be configured, e.g., by suitable programming, to implement certain emulator instructions 270.

According to a first aspect of the present disclosure the emulator 107 may begin method 260 by deciding which legacy game 106 will be pre-loaded at 261. This selection is made before a client device platform makes a request for a legacy game 106. By selecting a game to pre-load before the request is made by the client device platform 103, the game will be ready to play without a delay due to the loading. The selection process may be implemented by a prediction engine 147. The prediction engine 147 may be a process control program 133 stored in a memory 132 on the emulator 107 or on a mass storage 134. Alternatively, the prediction engine 147 may be located in a memory on the cloud based server 104.

According to aspects of the present disclosure, the prediction engine 147 may use historical data to choose which game will be pre-loaded. By way of example, the historical data may be information of how often a legacy game 106 is requested by all of the users accessing the cloud based server 104. This information may be further defined by the date and time. This information may show that there are patterns of usage based on the day of the week and/or the time of the day. For example, based on historical data, on Monday through Friday during the fall, there may be a historically observed spike in usage and requests for a particular first person shooting game at around 4:00 P.M. In order to have sufficient instances of the first person shooting game loaded when a client device platform 103 requests this specific legacy game 106, the emulator may choose the first person shooting legacy game 106 to pre-load.

Figure 4:
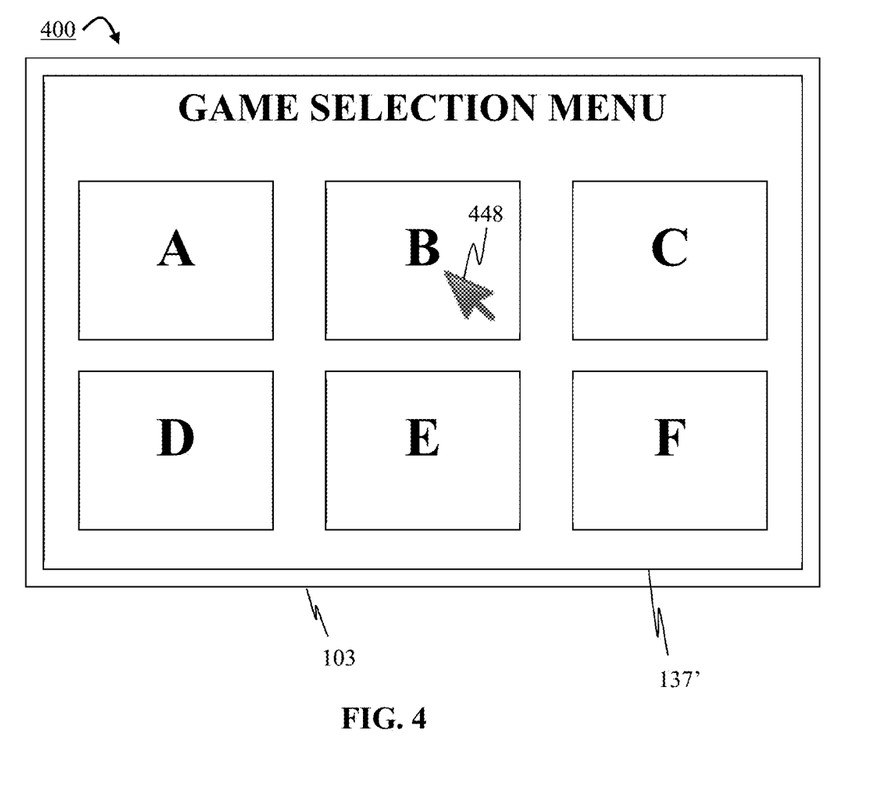
FIG. 4 is a drawing of the game selection menu displayed on a client device platform that illustrates how a prediction engine may determine which game to pre-load according to an aspect of the present disclosure.

According to additional aspects of the present disclosure, the prediction engine 147 may track the navigation of a client device platform on the cloud based server 104 in order to choose which legacy game 106 will be pre-loaded. By way of example, and not by way of limitation, the client device platform 103 may access a legacy game selection menu 400. The game selection menu 400 may be displayed on the display 137' of the client device platform. FIG. 4 is a diagram of the menu 400 as seen on the display 137'. Once the client device platform 103 accesses the menu 400, the emulator may begin pre-loading one of the legacy games A-F. Further, the emulator may track a cursor 448 in order to more accurately predict which of the legacy games will be requested by the client device platform 103. By way of example, if the cursor 445 is hovering over legacy game B, for a predetermined time, then the emulator may select legacy game B to pre-load. The navigation of the client device platform may also be tracked by alternative indicators. By way of example and not by way of limitation, eye tracking may be used to detect which game a user of the client device platform may be focusing on in order to make a selection of a game to pre-load.

According to addition aspects of the present disclosure, the prediction engine 147 may use a user profile corresponding to the client device platform 103 in order to choose which legacy game 106 will be pre-loaded. A user profile may track the usage history of a client device platform 103. By way of example, and not by way of limitation usage history may include which legacy games 106 the client device platform 103 has requested and how many times each legacy game 106 has been requested. The usage history may also track usage patterns for an individual client device platform based on the time of day and/or the day of the week. Through analyzing this information in the user profile, the prediction engine may more accurately select which legacy game 106 the client device platform 103 will request next.

According to additional aspects of the present disclosure, the prediction engine 147 may use triggers within a legacy game 106 that is currently being played by a client device platform 103 in order to choose which legacy game 106 should be pre-loaded. Triggers are further described in commonly assigned application Ser. No. 61/666,628 filed Jun. 29, 2012, and entitled "DETERMINING TRIGGERS FOR CLOUD-BASED EMULATED GAMES". By way of example, and not by way of limitation, triggers that may be used by the prediction engine could be a score, a time remaining in the game, or finishing a predetermined portion of a game. A score may be used by the prediction engine as an indication of the performance of the client device platform 103. If the score is above a certain value, then the client device platform 103 may be a skilled player, and may be more likely to request a similar game 106 that has a higher degree of difficulty next. In the alternative, if the score is below a certain value, then the client device platform 103 may be a novice player, and therefore may be more likely to request a legacy game 106 which has a lower degree of difficulty next. The time remaining in the game may be used by the prediction engine to indicate that a new legacy game 106 may be requested soon. When the client device platform 103 finishes a predetermined portion of the game, the prediction engine may determine that the next legacy game 106 in a series of legacy games 106 will be requested next, and therefore the emulator may begin pre-loading the next legacy game 106 in the series.

It should be noted that any of the previously stated types of information, or any other type of information may be used in combination or singularly by the prediction engine 147 in order to determine which legacy game 106 should be pre-loaded. Additionally, more than one legacy game may be pre-loaded in order to increase the probability that the legacy game 106 eventually requested by the client device platform 103 has been pre-loaded by the emulator 107.

Once the snapshot has been selected by the prediction engine 147, the emulator 107 may retrieve the legacy game 106 at 262. The legacy game 106 may be stored on a memory external to the emulator 107, but accessible over the network 160. By way of example, and not by way of limitation, the legacy game 106 may be stored on a memory on the cloud based server 104. Alternatively, the legacy game 106 may already be stored on a memory within the emulator 107 such as the mass storage 134 and therefore may be accessed over the internal system bus 150.

After the legacy game 106 has been retrieved by the emulator 107, method 260 continues with the emulator 107 beginning the translation of the legacy game data at 263. The translation of the legacy game data is an emulation of the legacy game 106 which allows the legacy game 106 to be translated into a format that is compatible with the client device platform 103. The translation of the game may be ended once the game is at a starting position. The starting position may be an initial game menu, or it may be where the game play begins. The translated legacy game data is then stored in a memory 132 on the emulator at 264. The memory may be a cache memory in order to increase the speed of delivery once the game is requested. Finally at 265, the translated legacy game data is delivered to the client device platform 103 over the network 160 when the client device platform 103 makes a request for the legacy game 106.

Figure 2B:
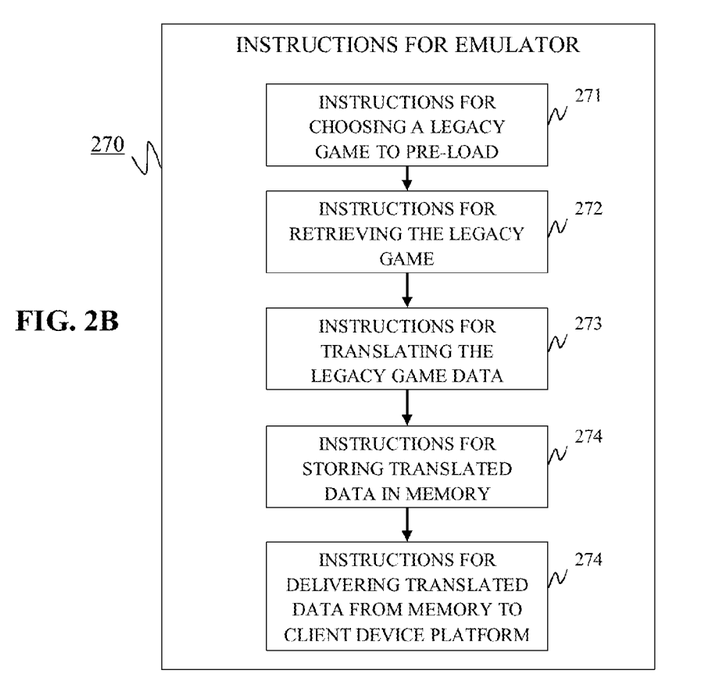
FIG. 2B is a block diagram describing the instructions for how an emulator may pre-load an application according to an aspect of the present disclosure.

As shown in FIG. 2B, a set of emulator instructions 270 may be implemented, e.g., by the emulator 107. The emulation instructions 270 may be formed on a nontransitory computer readable medium such as the memory 132 or the mass storage device 134. The emulator instructions 270 may also be part of the process control program 133. The instructions include choosing a legacy game 106 to pre-load at 271. Thereafter, the instructions include retrieving the legacy game 106 at 272. Next, the emulator 107 is provided with instructions for translating the legacy game data into a format that is compatible with the client device platform at 273. Once the legacy game data has been translated, the emulator instruction 270 may include storing the translated legacy game data in a memory at 274. Finally, at 275 the instructions may include delivering the translated legacy game data over the network to the client device platform 103 after the request for the legacy game 106 has been made by the client device platform 103.

Figure 3A:
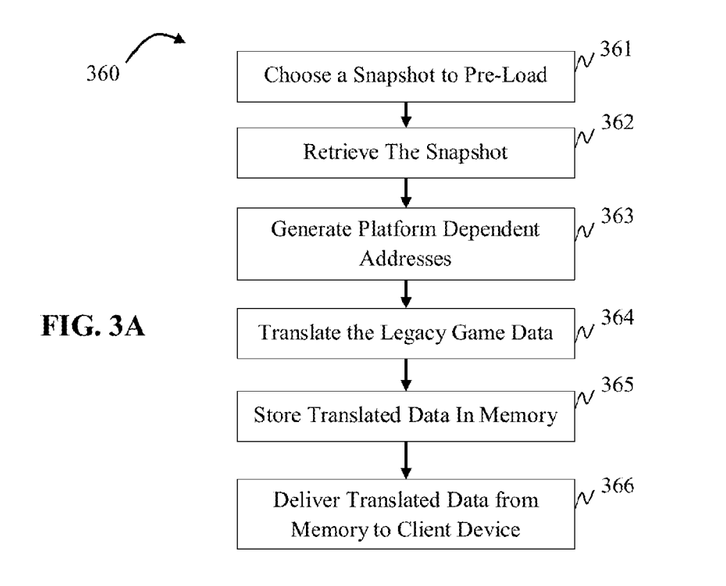
FIG. 3A is a block diagram of a method for pre-loading a snapshot according to an aspect of the present disclosure.

FIG. 3A is a bock diagram of a method 360 in accordance with an additional aspect of the present disclosure. This additional aspect of the present disclosure describes how a snapshot may be pre-loaded by an emulator 107. Snapshots are platform-independent recordings of the state of the emulator 107 at a point during emulation of a legacy game 106. Snapshots may contain platform-dependent information that can be useful but not essential for restoring the state of the emulation. For example, a snapshot may include a number of graphics processor plug-ins, such as a texture cache, that may be ignored. Snapshots are further described in commonly assigned application Ser. No. 61/666,679, filed Jun. 29, 2012, and entitled "SUSPENDING STATE OF CLOUD-BASED LEGACY APPLICATIONS". Snapshots may be used when the game being loaded is a mini-game. Mini-games are short portions of a game that might not begin at the designated starting position of the legacy game 106 as originally designed. Mini-games are further described in commonly-assigned, application Ser. No. 13/631,740, filed the same day as the present application, and entitled "METHOD FOR CREATING A MINI-GAME".

As shown in FIG. 3A, the emulator 107 may be configured to implement a method for pre-loading a snapshot according to an inventive method 360. Various aspects of the method 360 may be implemented by execution of computer executable instructions running on the emulator 107 in conjunction with the actions of the client device platform 103. Specifically, an emulator 107 may be configured, e.g., by suitable programming, to implement certain emulator instructions 370.

According to an aspect of the present disclosure, the emulator 107 may begin method 260 by determining which snapshot will be pre-loaded at 261. This selection is made before a client device platform 103 makes a request for a snapshot to be loaded. By selecting a snapshot to pre-load before the request is made by the client device platform 103, the snapshot will be ready to play without a delay. The process of pre-loading a snapshot is important for preventing a delay in the gaming experience for the user because snapshots may not begin at the original starting position of the legacy game 106 they are generated from. Since the snapshot initiates the play of the game from an intermediate position of the legacy game 106, incremental buffering may not be available. Without incremental buffering the loading of the snapshot may require additional loading time to because a larger buffer is needed to initiate the game play, as opposed to the smaller buffer when incremental buffering is available.

The selection process may be implemented by a prediction engine 147. The prediction engine 147 may be a process control program 133 stored in a memory 132 on the emulator 107 or on a mass storage 134. The prediction engine 147 may be similar to that of the prediction engine described above for use with loading a legacy game 106 from its original starting position. As such, in order to predict which snapshot will be chosen next by the client device platform 103, the prediction engine 147 may use historical data, track the navigation of a client device platform on the cloud based server 104, utilize a user profile corresponding to the client device platform 103, or use triggers within a legacy game 106 that is currently being played by a client device platform 103.

It should be noted that each of the previously stated types of information or any other type of information may be used in combination or singularly by the prediction engine 147 in order to determine which snapshot should be pre-loaded. Additionally, more than one snapshot may be pre-loaded in order to increase the probability that the snapshot eventually chosen by the client device platform 103 has been pre-loaded by the emulator 107.

Once the snapshot has been selected by the prediction engine 147, the emulator 107 may retrieve the snapshot at 362. The snapshot may be stored on a memory external to the emulator 107, but accessible over the network 160. By way of example, and not by way of limitation, the snapshot may be stored on a memory on the cloud based server 104. Alternatively, the snapshot may already be stored on a memory within the emulator 107 such as the mass storage 134 and therefore may be accessed over the internal system bus 150.

Once the snapshot has been retrieved, the emulator 107 may generate the platform dependent addresses for the specific instance of the emulator 107 at 364. According to some aspects of the present disclosure the address space for every instance of an emulator 107 may be randomized for security purposes through address space layout randomization (ASLR). Therefore, the emulator's address space may be abstracted from the snapshot in order for a snapshot to be platform independent. As such, in order to pre-load a snapshot, the address space information for the specific instance of the emulator 107 that is loading the snapshot may need to be generated. The specific address information may be generated from the platform independent information within the snapshot with an automated script. Additional information may be added to a translated code cache that marks dependent addresses for code and/or data. By way of example, and not by way of limitation, when a device loads the snapshot, markers in the code cache may be used to relocate code and/or data to reflect the changed emulating system's memory map.

After the address information is generated, the emulator 107 may begin translating the legacy game data at 364 in order to build a buffer. The translation of the legacy game data is an emulation of the legacy game 106 which allows the legacy game 106 to be in a format that is compatible with the client device platform 103. The snapshot provides the starting position of the legacy game 106, and instructs every device running on the emulator 107 what state it should be in for the legacy game 106 to be executed properly from that point. However, since the snapshot starting point may not be the original starting position of the legacy game 106, a buffer may also be needed since there might not be incremental buffering at that position of the legacy game 106. The translation of the legacy game data may be ended once the game is at the snapshot starting position and a sufficient buffer has been built to run the game properly from that position. Thereafter, the translated buffered data is stored in a memory 132 on the emulator 107 at 365. The memory may be a cache memory in order to increase the speed of delivery once the snapshot is requested by the client device platform 103. Finally at 366, the translated legacy game data is delivered to the client device platform 103 over the network 160 when the client device platform 103 makes a request for the snapshot.

Figure 3B:
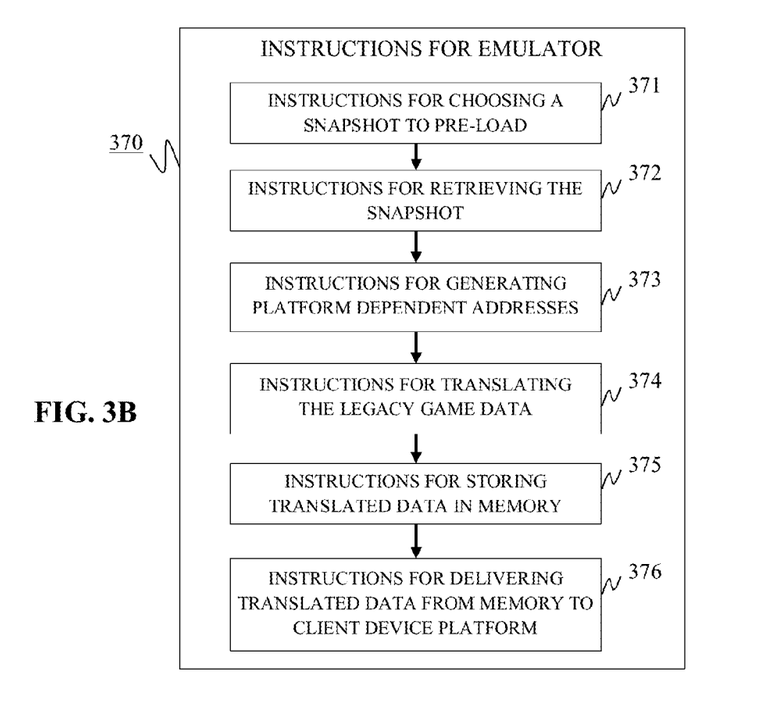
FIG. 3B is a block diagram describing the instructions for how an emulator may pre-load a snapshot according to an aspect of the present disclosure.

As shown in FIG. 3B, a set of emulator instructions 370 may be implemented, e.g., by the emulator 107. The emulation instructions 370 may be formed on a nontransitory computer readable medium such as the memory 132 or the mass storage device 134. The emulator instructions 370 may also be part of the process control program 133. The instructions include choosing a snapshot to pre-load at 371. Next, the emulator 107 is provided with instructions for retrieving the snapshot at 372. Thereafter, the instructions include generating the platform dependent addresses that allow the emulator 107 to process the snapshot at 373. Then at 374, the instructions include building a buffer by translating the legacy game data into a format that is compatible with the client device platform at 374. Once the legacy game data has been translated, the emulator instruction 370 may include storing the translated legacy game data in a memory at 375. Finally, the instructions may include delivering the translated legacy game data over the network 160 to the client device platform 103 after the request for the game has been made by the client device platform 103 at 376.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A nontransitory computer readable medium containing executable program, wherein execution of the program instructions by one or more processors of a computer system causes the one or more processors to implement a method comprising:

retrieving pre-translated code for an emulated application before receiving a request for the emulated application from a client device wherein the pre-translated code for the emulated application includes a platform independent recording of a state of an emulator at a point during emulation of a legacy application;

executing the pre-translated code for the emulated application to translate data from the emulated application into a form compatible with the client device before receiving the request for the emulated application from the client device, wherein translating the data from the emulated application into a form compatible with the client device includes building a buffer of data that is sufficient to run the emulated application at the point during emulation of the legacy application; and delivering the translated data to the client device platform over a network after receiving the request for the emulated application from the client device.

2. The nontransitory computer readable medium of claim 1, wherein the emulated application is a legacy game.

3. The nontransitory computer readable medium of claim 1, wherein the memory is a cache.

4. The nontransitory computer readable medium of claim 1, wherein the pre-translated code is loaded before a request for the emulated application is made by the client device platform.

5. The nontransitory computer readable medium of claim 1, wherein the method further comprises choosing which emulated application of a plurality of emulated applications to pre-load with a prediction engine.

6. The nontransitory computer readable medium of claim 5, wherein the prediction engine uses historical data of the number of client device platforms that have made a request for the emulated application in order to choose which emulated application to pre-load.

7. The nontransitory computer readable medium of claim 6, wherein the historical data further includes a time and date with each request for the emulated application.

8. The nontransitory computer readable medium of claim 5, wherein the prediction engine uses data from a user profile associated with the client device platform that is searching for an emulated application in order to choose which emulated application to pre-load.

9. The nontransitory computer readable medium of claim 5, wherein the prediction engine uses triggers from a second application that is being played by the client device platform in order to choose which emulated application to pre-load.

10. The nontransitory computer readable medium of claim 5, wherein the prediction engine tracks the client device platform as it navigates an application selection menu in order to choose which emulated application to pre-load.

11. The nontransitory computer readable medium of claim 10, wherein the prediction engine follows a cursor controlled by the client device platform in order to track the navigation.

12. The nontransitory computer readable medium of claim 10, wherein the prediction engine follows one or more eyes belonging to a user controlling the client device platform in order to track the navigation.

13. An emulator configured to operate on a network, comprising:
one or more processors;
a memory coupled to the one or more processors;
one or more executable instructions embodied in memory, the instructions being configured to implement a method when executed by the one or more processors, the method comprising:
retrieving pre-translated code for an emulated application before a request for the emulated application is received from a client device wherein the pre-translated code for the emulated application includes a platform independent recording of a state of an emulator at a point during emulation of a legacy application;

executing the pre-translated code for the emulated application to translate data from the emulated application into a form compatible with the client device before receiving the request for the emulated application from the client device, wherein translating the data from the emulated application into a form compatible with the client device includes building a buffer of data that is sufficient to run the emulated application at the point during emulation of the legacy application; and delivering the translated data to the client device over a network after receiving the request for the emulated application from the client device.

14. The emulator of claim 13, wherein the emulated application is a legacy game.

15. The emulator of claim 13, wherein the memory is a cache.

16. The emulator of claim 13, wherein the pre-translated code is loaded before a request for the emulated application is made by the client device platform.

17. The emulator of claim 13, wherein the method further comprises choosing which emulated application of a plurality of emulated applications to pre-load with a prediction engine.

18. The emulator of claim 17, wherein the prediction engine uses historical data of the number of client device platforms that have made a request for the emulated application in order to choose which emulated application to pre-load.

19. The emulator of claim 18, wherein the historical data further includes a time and date with each request for the emulated application.

20. The emulator of claim 17, wherein the prediction engine uses data from a user profile associated with the client device platform that is searching for an emulated application in order to choose which emulated application to pre-load.

21. The emulator of claim 17, wherein the prediction engine uses triggers from a second application that is being played by the client device platform in order to choose which emulated application to pre-load.

22. The emulator of claim 17, wherein the prediction engine tracks the client device platform as it navigates an application selection menu in order to choose which emulated application to pre-load.

23. The emulator of claim 22, wherein the prediction engine follows a cursor controlled by the client device platform in order to track the navigation.

24. The emulator of claim 22, wherein the prediction engine follows one or more eyes belonging to a user controlling the client device platform in order to track the navigation.

25. In an emulator configured to operate on a network, a method, comprising:
retrieving pre-translated code for an emulated application before receiving a request for the emulated application from a client device wherein the pre-translated code for the emulated application includes a platform independent recording of a state of an emulator at a point during emulation of a legacy application;

executing the pre-translated code for the emulated application to translate data from the emulated application into a form compatible with the client device before receiving the request for the emulated application from the client device, wherein translating the data from the emulated application into a form compatible with the client device includes building a buffer of data that is sufficient to run the emulated application at the point during emulation of the legacy application; and delivering the translated data to the client device platform over the network after receiving the request for the emulated application from the client device.

* * * * *